(12) United States Patent
Azuma et al.

(10) Patent No.: US 8,312,793 B2
(45) Date of Patent: Nov. 20, 2012

(54) HYDRAULIC PRESSURE SUPPLY DEVICE FOR INDUSTRIAL VEHICLE

(75) Inventors: Hiroyuki Azuma, Ushiku (JP); Atsushi Shimazu, Toride (JP); Masaki Yoshikawa, Kasama (JP); Kosei Suzuki, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 461 days.

(21) Appl. No.: 12/679,820

(22) PCT Filed: Sep. 25, 2008

(86) PCT No.: PCT/JP2008/067292
§ 371 (c)(1),
(2), (4) Date: Mar. 24, 2010

(87) PCT Pub. No.: WO2009/041495
PCT Pub. Date: Apr. 2, 2009

(65) Prior Publication Data
US 2010/0204008 A1  Aug. 12, 2010

(30) Foreign Application Priority Data
Sep. 26, 2007  (JP) .................................. 2007-248308

(51) Int. Cl.
*F16H 47/00* (2006.01)
(52) U.S. Cl. .......................... 74/730.1; 74/731.1; 60/422
(58) Field of Classification Search .................. 74/730.1, 74/731.1; 60/422, 420, 484, 325
See application file for complete search history.

(56) References Cited

U.S. PATENT DOCUMENTS
3,347,042 A * 10/1967 Horsch ........................... 60/337
(Continued)

FOREIGN PATENT DOCUMENTS
JP    63-134118 U    9/1988
(Continued)

OTHER PUBLICATIONS
International Search Report dated Dec. 2, 2008 (one (1) page).

*Primary Examiner* — Ha D. Ho
*Assistant Examiner* — Valentin Craciun
(74) *Attorney, Agent, or Firm* — Crowell & Moring LLP (57) ABSTRACT

A first hydraulic circuit leads, as clutch control pressure, pressurized oil supplied from a first hydraulic pump, to a transmission control device after regulating the pressurized oil, and leads, as torque converter operation oil, pressured oil to a torque converter, and leads pressurized oil to an oil cooler. Through a second hydraulic circuit, pressurized oil from a second hydraulic pump is distributed to a circuit portion downstream of the pressure regulation valve and upstream of a safety valve and to a circuit portion downstream of the torque converter and upstream of the oil cooler. A flow control device changes a proportion of a rate of flow in the second hydraulic circuit so that a proportion of the rate of flow to the circuit portion downstream of the torque converter and upstream of the oil cooler increases as pressure at an entrance of the torque converter increases.

4 Claims, 8 Drawing Sheets

U.S. PATENT DOCUMENTS

| | | | | |
|---|---|---|---|---|
| 3,987,874 A | * | 10/1976 | Fuehrer et al. | 188/296 |
| 4,209,985 A | * | 7/1980 | Master | 60/337 |
| 4,324,387 A | * | 4/1982 | Steinhagen | 254/310 |
| 4,846,765 A | * | 7/1989 | Sakai | 474/28 |
| 5,174,422 A | * | 12/1992 | Murakami | 192/3.27 |
| 5,273,492 A | * | 12/1993 | Kashiwase et al. | 474/43 |
| 5,513,732 A | * | 5/1996 | Goates | 192/3.3 |
| 7,299,629 B2 | * | 11/2007 | Betz et al. | 60/488 |
| 2010/0024412 A1 | * | 2/2010 | Hyodo et al. | 60/426 |
| 2010/0095663 A1 | * | 4/2010 | Hyodo et al. | 60/420 |
| 2011/0011075 A1 | * | 1/2011 | Sakamoto | 60/329 |

FOREIGN PATENT DOCUMENTS

| | | |
|---|---|---|
| JP | 5-330349 A | 12/1993 |
| JP | 10-299863 A | 11/1998 |
| JP | 11-173412 A | 6/1999 |
| JP | 2000-190858 A | 7/2000 |
| JP | 2005-163979 A | 6/2005 |
| JP | 2007-177868 A | 7/2007 |

\* cited by examiner

HYDRAULIC PRESSURE SUPPLY DEVICE FOR INDUSTRIAL VEHICLE

TECHNICAL FIELD

The present invention relates to a hydraulic pressure supply device for industrial vehicle.

BACKGROUND ART

Devices installed in industrial vehicles such as wheel loaders having a torque converter include those lead, as operation oil, pressurized oil from a hydraulic pump to a torque converter and lead, as clutch control pressure, pressurized oil to a control valve for clutch control of a transmission (see, for instance, patent reference literature 1). In the device described in patent reference literature 1, a pressure regulation valve is provided so that clutch control pressure supplied to the control valve becomes a predetermined set pressure, thereby leading pressurized oil exceeding the set pressure that has passed through the pressure regulation valve to the torque converter, and leading pressurized oil that has passed through the torque converter to an oil cooler. A safety valve is placed between the pressure regulation valve and the torque converter so as to limit the pressure at the entrance of the torque converter, thereby returning oil that has passed through the safety valve to a reservoir.

Patent reference literature 1: Japanese Laid Open Patent Publication No. 2005-163979 (FIG. 2)

DISCLOSURE OF THE INVENTION

Problems to be Solved by the Invention

The amount of heat of oil in a torque converter increases as the rotational difference between a pump impeller and a turbine runner in the torque converter increases. Since oil temperature rises significantly particularly in a stall state in which a bucket of a wheel loader is dug into an excavation target or in an overrun state in which the vehicle travels downslope, it is necessary to supply a sufficient amount of operation oil to the torque converter so as to prevent the rise in the oil temperature. However, in the device described in patent reference literature 1, a simple increase in pump output volume can not effectively prevent the rise in the oil temperature because an increase in amount of oil passing through the safety valve results in a rise in oil temperature.

Means for Solving the Problems

A hydraulic pressure supply device for industrial vehicle according to the present invention comprises: a first hydraulic pump and a second hydraulic pump that are driven by an engine; a first hydraulic circuit that leads, as clutch control pressure, pressurized oil which is supplied from the first hydraulic pump to a transmission after regulating the pressurized oil by a pressure regulation valve, and that leads, as torque converter operation oil, pressurized oil which has passed through the pressure regulation valve to a torque converter, and then leads pressurized oil which has passed through the torque converter to an oil cooler; a safety valve that is connected to the first hydraulic circuit between the pressure regulation valve and the torque converter and, that releases pressurized oil on a torque converter entrance side to a reservoir when pressure on an entrance side of the torque converter is equal to or greater than a predetermined value; a second hydraulic circuit, through which pressurized oil from the second hydraulic pump is distributed to a circuit portion downstream of the pressure regulation valve and upstream of the safety valve and to a circuit portion downstream of the torque converter and upstream of the oil cooler; and a flow control device that changes a proportion of a rate of flow in the second hydraulic circuit so that a proportion of the rate of flow to the circuit portion downstream of the torque converter and upstream of the oil cooler increases as pressure at an entrance of the torque converter increases.

A check valve may be disposed in the second hydraulic circuit, through which pressurized oil from the second hydraulic pump is led to the circuit portion downstream of the torque converter and upstream of the oil cooler, and a cracking pressure at the check valve maybe set so that operating pressure at the check valve is substantially equal to a set pressure at the safety valve.

In place of the check valve, an on/off valve of external pilot type that switched by a pressure at an entrance of the torque converter may be disposed.

A directional control valve of external pilot type may be disposed at a branch point at which pressurized oil from the second hydraulic pump is distributed to the circuit portion downstream of the pressure regulation valve and upstream of the safety valve and to the circuit portion downstream of the torque converter and upstream of the oil cooler, and that is switched by a pressure at an entrance of the torque converter.

Advantageous Effect of the Invention

According to the present invention, since the proportion of the rate of flow of pressurized oil that bypasses the torque converter and is led to the oil cooler increases as the pressure at the entrance of the torque converter increases, the rise in the oil temperature can be effectively prevented.

BEST MODE FOR CARRYING OUT THE INVENTION

A hydraulic pressure supply device for industrial vehicle according to an embodiment of the present invention will now be explained with reference to the drawings.

Figure 4:
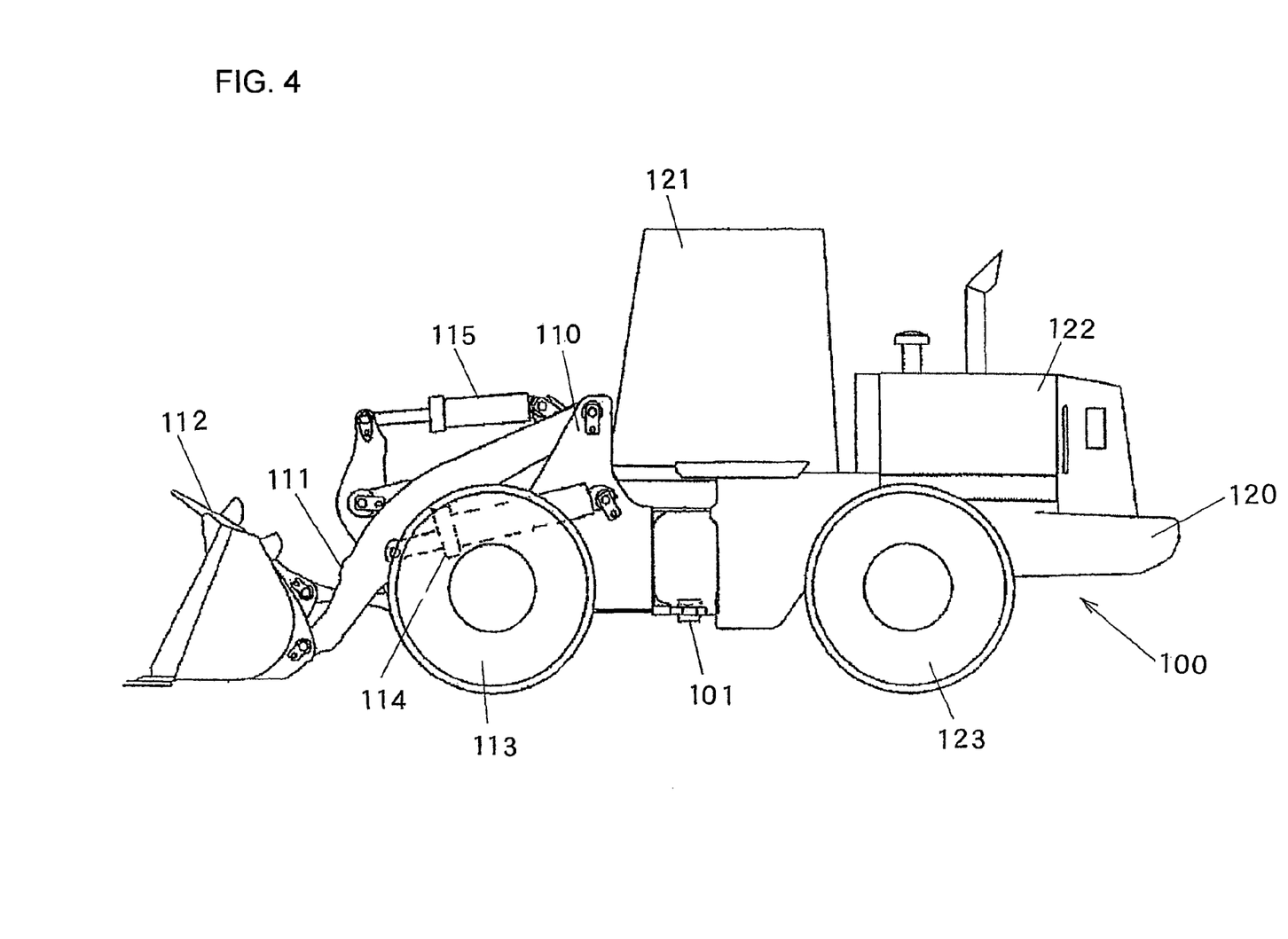
[FIG. 4] A side view of a wheel loader to which the hydraulic pressure supply device according to the present embodiment is applied

FIG. 4 is a side view of a wheel loader, an example of industrial vehicles to which the hydraulic pressure supply device according to the present embodiment is applied. A wheel loader 100 is constituted by a front body 110 that includes an arm 111, a bucket 112, tires 113, and the like, and a rear body 120 that includes an operator's cab 121, an engine bay 122, tires 123, and the like. The arm 111 vertically rotates (rises or lowers) by drive of an arm cylinder 114, whereas the bucket 112 vertically rotates (dumps or crowds) by drive of a bucket cylinder 115. The front body 110 and the rear body 120 are rotatably connected to each other by a center pin 101 so that expansion and contraction of a steering cylinder (not figured herein) allows the front body 110 to move right and left relative to the rear body 120.

Figure 5:
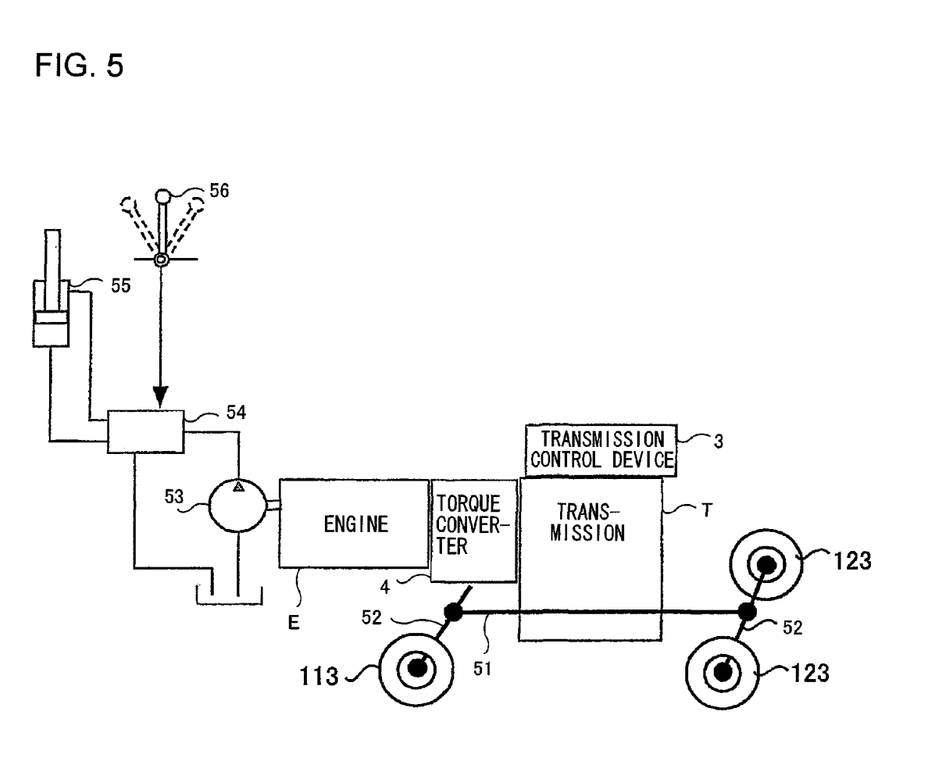
[FIG. 5] An illustration showing an outline structure of the travel drive system of the wheel loader of FIG. 4

FIG. 5 is an illustration showing an outline structure of the travel drive system of the wheel loader 100. An input shaft (4*a* shown in FIG. 6) of a torque converter 4 is connected to an output shaft of an engine E, and an output shaft (4*b* shown in FIG. 6) of the torque converter 4 is connected to a transmission T. The torque converter 4 is a fluid clutch constituted by a known impeller, a turbine, and a stator, and rotation of the engine E is transmitted to the transmission T via the torque converter 4. The transmission T includes a hydraulic clutch that shifts the transmission gear from first to fourth, and the transmission gear is changed by the transmission control device 3. Rotation of the output shaft of the torque converter 4 is shifted by the transmission T, and the shifted rotation is transmitted to the tires 113 and 123 via a propeller shaft 51 and axles 52 so that the wheel loader travels.

A work hydraulic pump 53 is driven by the engine E, and output or discharged oil from the hydraulic pump 53 is led to a work actuator 55 (for example, the arm cylinder 114) through a direction control valve 54. The direction control valve 54 is driven by operation of an operation lever 56. The actuator 55 is driven in accordance with operation amount of the operation lever 56. It is to be noted that although as described later the hydraulic pressure supply device of the present embodiment is provided with hydraulic pumps 1 and 2 for the torque converter and the transmission (FIG. 1), they are not figured in FIG. 5.

Figure 6:
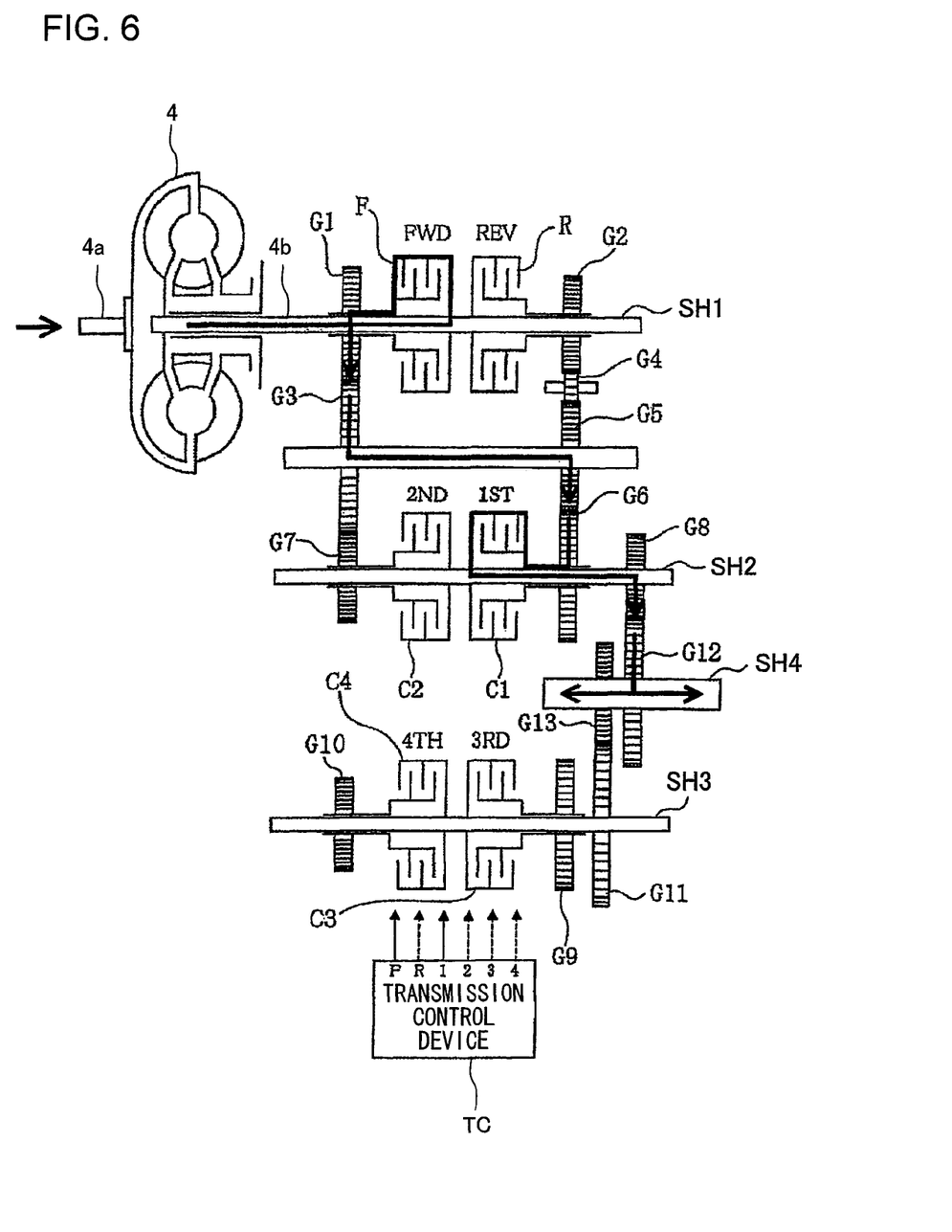
[FIG. 6] An illustration showing an outline structure of the transmission of FIG. 5

The structure of the transmission T will be explained. FIG. 6 is an illustration showing an outline structure of the transmission T. The transmission T includes a plurality of clutch shafts SH1 to SH3, an output shaft SH4, a plurality of gears G1 to G13, a forward hydraulic clutch F, a reverse hydraulic clutch R, and hydraulic clutches C1 to C4 in first to fourth gears. The hydraulic clutches F, R, and C1 to C4 are each engaged or released by pressurized oil (clutch pressure) supplied through the transmission control device 3. Namely, the hydraulic clutches F, R, and C1 to C4 are engaged as clutch pressure supplied to the hydraulic clutches F, R, and C1 to C4 increases, whilst they are released as clutch pressure decreases.

The output shaft 4*b* of the torque converter 4 is connected to the crankshaft SH1, and the both ends of the crankshaft SH4 are connected to the front and the rear axles 52 through the propeller shaft 51 of FIG. 5. In FIG. 6, the forward clutch F and the clutch C1 in first gear assume an engaged state, while the other clutches R and C2 to C4 assume a released state.

In this case, the gear G1 and the clutch shaft SH1 integrally rotate, and the gear G6 and the clutch shaft SH2 integrally rotate.

At this time, as represented by a thick line in FIG. 6, output torque of the engine E is transmitted to the output shaft SH4 through the input shaft 4*a* and the output shaft 4*b* of the torque converter 4, the clutch shaft SH1, the forward clutch F, the gears G1, G3, G5, and G6, the clutch C1 in first gear, the clutch shaft SH2, and the gears G8 and G12. Thus, travel in first gear is enabled.

In the case of gear change from first gear to second gear, clutch pressure supplied through the transmission control device 3 releases the clutch C1 in first gear and engages the clutch C2 in second gear. This causes output torque of the engine E to be transmitted to the output shaft SH4 through the input shaft 4*a* and the output shaft 4*b* of the torque converter 4, the clutch shaft SH1, the forward clutch F, the gears G1, G3, and G7, the clutch C2 in second gear, the clutch shaft SH2, and the gears G8 and G12, and thus travel in second gear is enabled. Gear changes other than that from first gear to second gear, i.e., those from second to third, from third to fourth, from fourth to third, from third to second, and from second to first, are performed by controlling the clutches C1 to C4 in the same manner.

Figure 7:
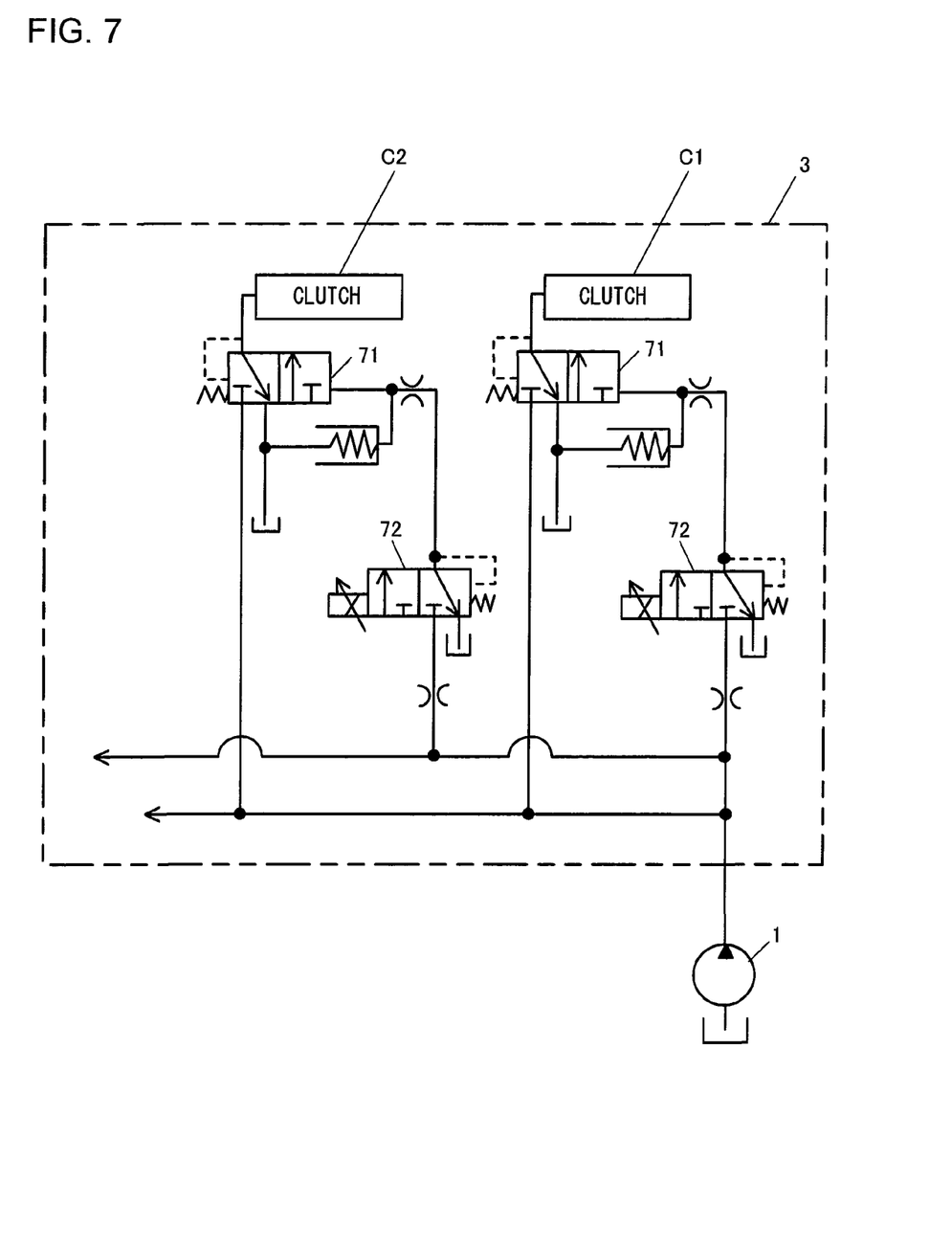
[FIG. 7] An illustration showing an outline structure of the transmission control device of FIG. 5

FIG. 7 presents an outline structure of the transmission control device 3, in particular, the structure of a hydraulic circuit through which clutch pressure is supplied to the clutch C1 in first gear and the clutch C2 in second gear. It is to be noted that the structures of a hydraulic circuit of the other clutches F, R, C3, and C4 are the same, although they are not figured. Namely, the transmission control device 3 is provided with oil pressure switching valves 71 and electromagnetic proportional pressure reducing valves 72 corresponding to each of the clutches F, R, and C1 to C4. Pressurized oil from a hydraulic source (hydraulic pump 1 in FIG. 1) is applied to a pilot port of the oil pressure switching valve 71 through the electromagnetic proportional pressure reducing valve 72. By this, the oil pressure switching valve 71 is switched, and clutch pressure to each of the clutches F, R, and C1 to C4 is controlled. The electromagnetic proportional pressure reducing valve 72 is switched by a control signal from a controller that is not figured.

Figure 1:
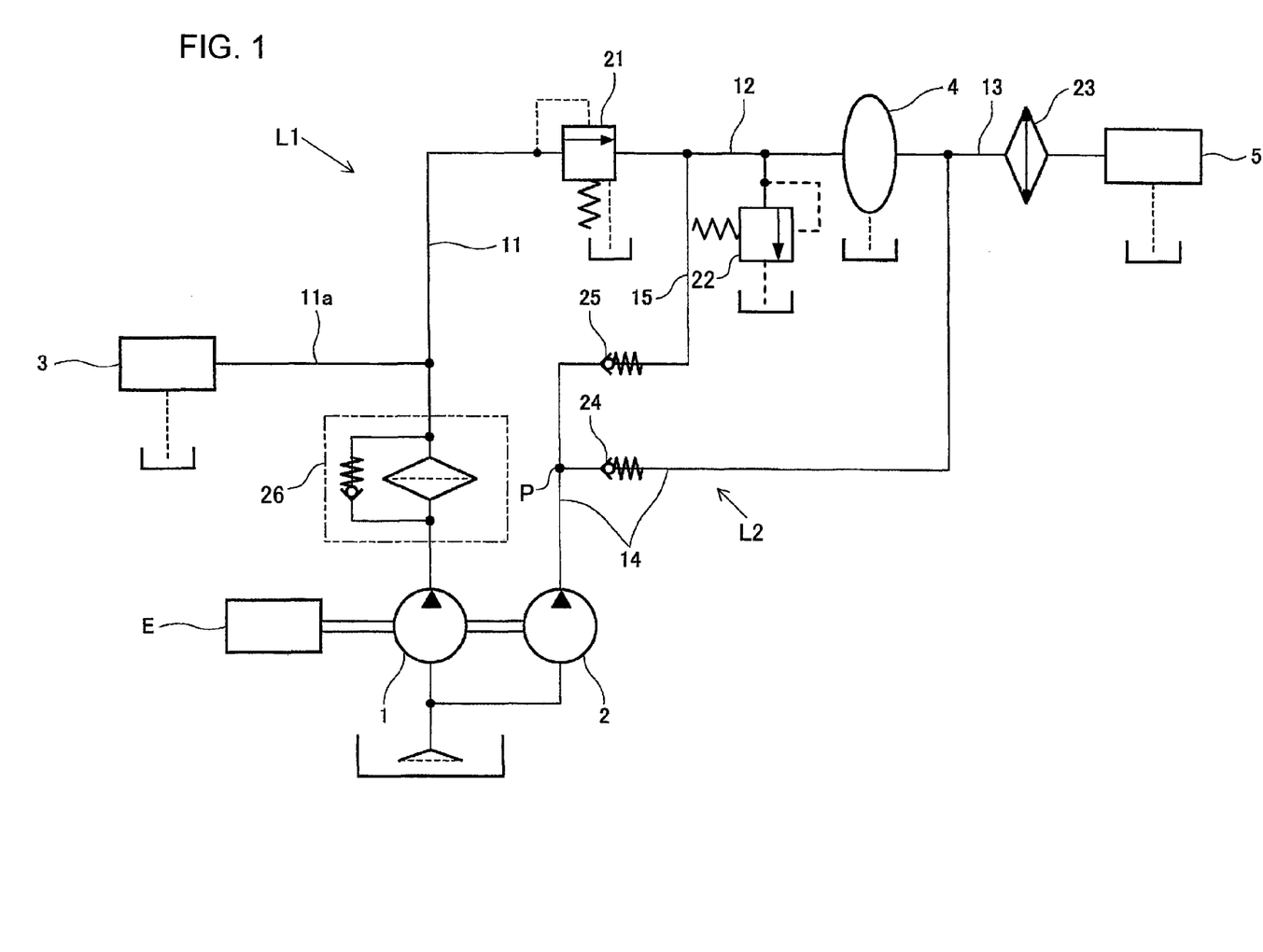
[FIG. 1] A hydraulic circuit diagram showing the structure of a hydraulic pressure supply device for industrial vehicle according to an embodiment of the present invention

FIG. 1 is an illustration showing the structure of the hydraulic pressure supply device according to the present embodiment, which is a hydraulic circuit diagram for the torque converter and the transmission. The hydraulic pressure supply device includes a main hydraulic pump 1 and a secondary hydraulic pump 2 driven by the engine E, and includes a main hydraulic circuit L1 through which pressurized oil from the main hydraulic pump 1 is led to the torque converter 4 and the transmission control device 3 and a secondary hydraulic circuit L2 through which pressurized oil from the secondary hydraulic pump 2 is led and merged to the main hydraulic circuit L1. The hydraulic pumps 1 and 2 are of a fixed displacement type, and output volumes (delivery flow rates) of the hydraulic pumps 1 and 2 each increase as rotation speed of the engine E increases.

The main hydraulic circuit L1 is explained. A regulator 21 is connected to the main hydraulic pump 1 through an oil filter 26 and a pipeline 11. The pipeline 11 branches into a pipeline 11*a*, through which pressurized oil having been regulated by a regulator 21 is supplied to the transmission control device 3, i.e., the oil pressure switching valve 71, as clutch pressure. This allows clutch pressure to be applied to the clutches F, R, and C1 to C4 sufficiently. It is to be noted that set pressure of the regulator 21 is, for instance, approximately 2.3 MPa.

The torque converter 4 is connected to the regulator 21 through a pipeline 12, so that pressurized oil that has passed through the regulator 21 is supplied to the torque converter 4 as operation oil. A safety valve 22 (relief valve) is connected to the pipeline 12, so that pressurized oil in the pipeline 12 is relieved to a reservoir through the safety valve 22 when pressure in the pipeline 12 exceeds a set pressure P22 at the safety valve 22. As a result, pressure applied to the torque converter 4 is limited to equal to or less than the set pressure P22. The set pressure P22 is set to, for instance, 0.95 MPa in view of pressure resistance of the torque converter 4 and the like. It is to be noted that the pressure at the entrance of the torque converter 4 tends to increase as the rotational difference between the input shaft and the output shaft of the torque converter 4 is greater and oil temperature is lower in the state in which an amount of pressurized oil supply to the torque converter 4 has increased.

A lubrication circuit unit 5 for supplying lubricating oil to a clutch section of the transmission T is connected to the torque converter 4 through a pipeline 13 and an oil cooler 23, so that pressurized oil that has been cooled at the oil cooler 23 is led to the lubrication circuit unit 5. The oil having been led to the lubrication circuit unit 5 is returned to the reservoir so as to circulate around the hydraulic circuits L1 and L2.

The secondary hydraulic circuit L2 is explained. The secondary hydraulic pump 2 is connected to the pipeline 13 upstream of the oil cooler 23 through a pipeline 14. The pipeline 14 branches into a pipeline 15, and the pipeline 15 is connected to the pipeline 12 upstream of the safety valve 22. The pipeline 14 is provided with a check valve 24 downstream of a branch point P, and the pipeline 15 is provided with a check valve 25.

A cracking pressure P24 is set in the check valve 24 so that its operating pressure becomes equal to the set pressure P22 of the safety valve 22. For instance, if back pressure of the check valve 24 in the pipeline 14 is approximately 0.45 MPa, a cracking pressure P24 is set to approximately 0.5 MPa. On the other hand, the check valve 25 only needs to prevent pressurized oil in the pipeline 12 from flowing back to the pipeline 14, therefore a cracking pressure P25 at the check valve 25 is set to a value smaller than the cracking pressure P24 at the check valve 24, for instance, approximately 0.01 MPa. In case where pressurized oil is unlikely to flow back to the pipeline 14, the check valve 25 may be omitted.

Main operations of the present embodiment are explained.

The case in which the pressure at the entrance of the torque converter is equal to or less than the set pressure P22, i.e., the case in which engine rotation speed is low and pump delivery amount is small when, for example, the vehicle travels downslope or the like, is explained. Delivery oil from the main hydraulic pump 1 driven by the engine E is led to the pipeline 11 through the oil filter 26, and pressure in the pipeline 11 is regulated by the regulator 21. The pressurized oil having been regulated is led to the transmission control device 3 through the pipeline 11a and used for gear shifting operation by the transmission T.

Pressurized oil that has been discharged from the regulator 21 is supplied to the torque converter 4 through the pipeline 12. At this time, pressurized oil from the secondary hydraulic pump 2 is also supplied to the torque converter 4 through the pipelines 15 and 12. Therefore, even in the case where the rotational difference is great between the input shaft and the output shaft of the torque converter 4, and amount of heat generated at the torque converter 4 is great when the vehicle travels downslope or the like, sufficient amount of pressurized oil can be supplied from the two hydraulic pumps 1 and 2 to the torque converter 4, and the rise in oil temperature on an exit side of the torque converter 4 can be prevented. Pressurized oil that has been passed through the torque converter 4 is cooled at the oil cooler 23, and the amount of heat generated at the torque converter 4 is released from the circuit.

In this case, it is not necessary to increase delivery amount of the main hydraulic pump 1, therefore the main hydraulic pump 1 only needs to assure necessary amount of oil to the transmission control device 3. This allows the hydraulic pump 1 to be provided as a compact unit, reduces load applied to the hydraulic pump 1 on the high-pressure side, and reduces absorption torque of the hydraulic pump 1. Since the secondary hydraulic pump 2 is connected downstream of the regulator 21 and the secondary hydraulic circuit L2 is low in pressure, increase in load is small even if delivery amount of the secondary hydraulic pump 2 is increased, and therefore operation oil is supplied to the torque converter 4 effectively.

Next, the case in which engine rotation speed is high and the pressure at the entrance of the torque converter exceeds the set pressure P22 due to increase in pump delivery amount, such as a stall state when the bucket 112 is dug into an excavation target, is explained. If the pressure at the entrance of the torque converter is increased and exceeds the set pressure P22 of the safety valve 22, pressurized oil having been discharged through the regulator 21 is relieved through the safety valve 22, and pressure in operation oil at the torque converter 4 is limited equal to or less than the set pressure P22. This allows the torque converter 4 to be protected.

At this time, the check valve 24 is opened so that pressurized oil from the secondary hydraulic pump 2 bypasses the torque converter 4 and is led to the oil cooler 23 through the pipeline 14. As a result, in the case where the rotational difference between the input shaft and the output shaft of the torque converter 4 is great and amount of heat generated at the torque converter 4 is great, such as a stall state or the like, the proportion of the rate of flow in the secondary hydraulic circuit L2 is changed, so that the flow rate passing through the oil cooler 23 increases whilst the flow rate passing through the safety valve 22 decreases. Accordingly, oil temperature can be reduced throughout the circuit, and the rise in oil temperature on the exit side of the torque converter 4 can be reduced.

The present embodiment can achieve the following operational effects.

(1) The main hydraulic circuit L1 is formed so that pressurized oil from the main hydraulic pump 1 is regulated by the regulator 21 and led to the transmission control device 3, and pressurized oil that has passed through the regulator 21 is sequentially led to the torque converter 4 and the oil cooler 23, and the safety valve 22 is connected to the main hydraulic circuit L1 upstream of the torque converter 4. In addition, the secondary hydraulic circuit L2 is formed so that pressurized oil from the secondary hydraulic pump 2 is led to a circuit portion that is downstream of the regulator 21 and upstream of the safety valve 22 through the check valve 25 and to a circuit portion that is downstream of the torque converter 4 and upstream of the oil cooler 23 through the check valve 24, and so that the set pressure P22 at the safety valve 22 and operating pressure at the check valve 24 become substantially equal. This allows pressurized oil from the secondary hydraulic pump 2 to be preferentially supplied to the torque converter 4 when the pressure at the entrance of the torque converter 4 is equal to or less than the set pressure P22, and allows it to bypass the torque converter 4 and to be led to the oil cooler 23 when the pressure at the entrance of the torque converter 4 exceeds the set pressure P22. Thus, a sufficient amount of pressurized oil can be supplied to the torque converter 4, the amount of pressurized oil that passes through the safety valve 22 can be reduced, and the rise in oil temperature can be prevented. As a result, oil deterioration due to rise in oil temperature can be prevented, and a negative impact on the degree of torque transmission at the torque converter 4 can be prevented.

(2) By reducing flow rate passing through the safety valve 22, a sufficient amount of lubricating oil can be supplied to the lubrication circuit unit 5 downstream of the oil cooler 23.

(3) Since pressurized oil from the secondary hydraulic pump 2 is merged into pressurized oil from the main hydraulic pump 1 and led to the torque converter 4, delivery amount from the main hydraulic pump 1 on the high-pressure side is reduced, so that load applied to the hydraulic pump 1 can be reduced. As a result, output of the engine E can be reduced and fuel consumption can be improved. In addition, the capacity of the main hydraulic pump 1 can be reduced, so that the pump 1 can be provided as a compact unit.

Figure 2:
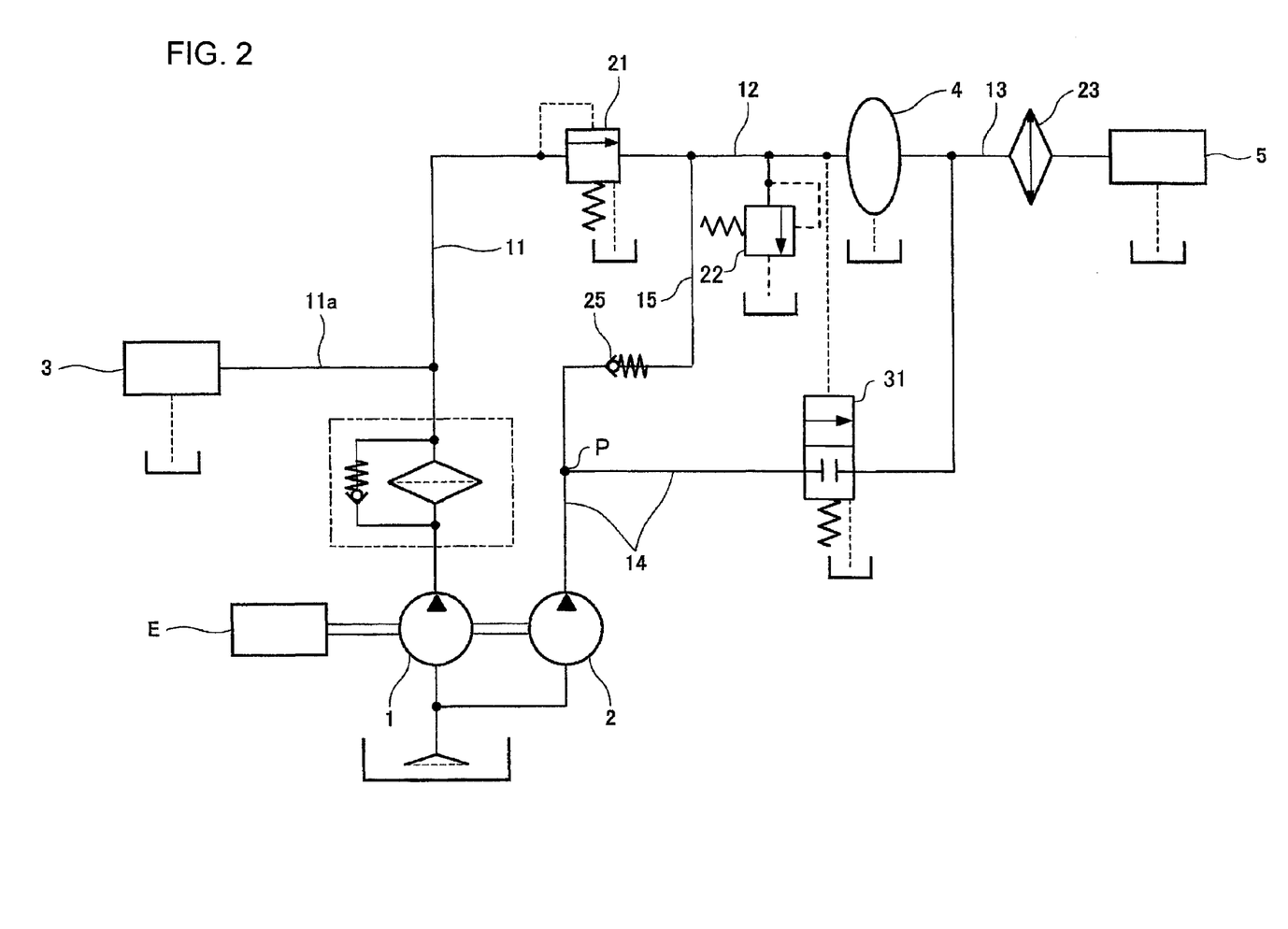
[FIG. 2] A diagram showing a variation of FIG. 1

It is to be noted that although in the above embodiment, the check valve 24 is provided in the pipeline 14, so as to increase the proportion of the flow rate on the pipeline 14 side as the pressure at the entrance of the torque converter 4 increases, the structure of the flow control device is not limited to that. For instance, as shown in FIG. 2, an on/off valve 31 of external pilot type may be provided in place of the check valve 24, to which, as external pilot pressure, pressurized oil in the pipeline 12 upstream of the torque converter 4 is to be led. In this case, operating pressure of the on/off valve 31 may be set to the same value as the set pressure P22 of the safety valve 22 (for example, 0.95 MPa). By this, when the pressure at the entrance of the torque converter is equal to or less than the set pressure P22, the on/off valve 31 is closed and pressurized oil from the secondary hydraulic pump 2 is supplied to the torque converter 4. When the pressure at the entrance of the torque converter exceeds the set pressure P22, the on/off valve 31 is opened, and pressurized oil from the secondary hydraulic pump 2 is supplied to the oil cooler 23 through the on/off valve 31.

Figure 3:
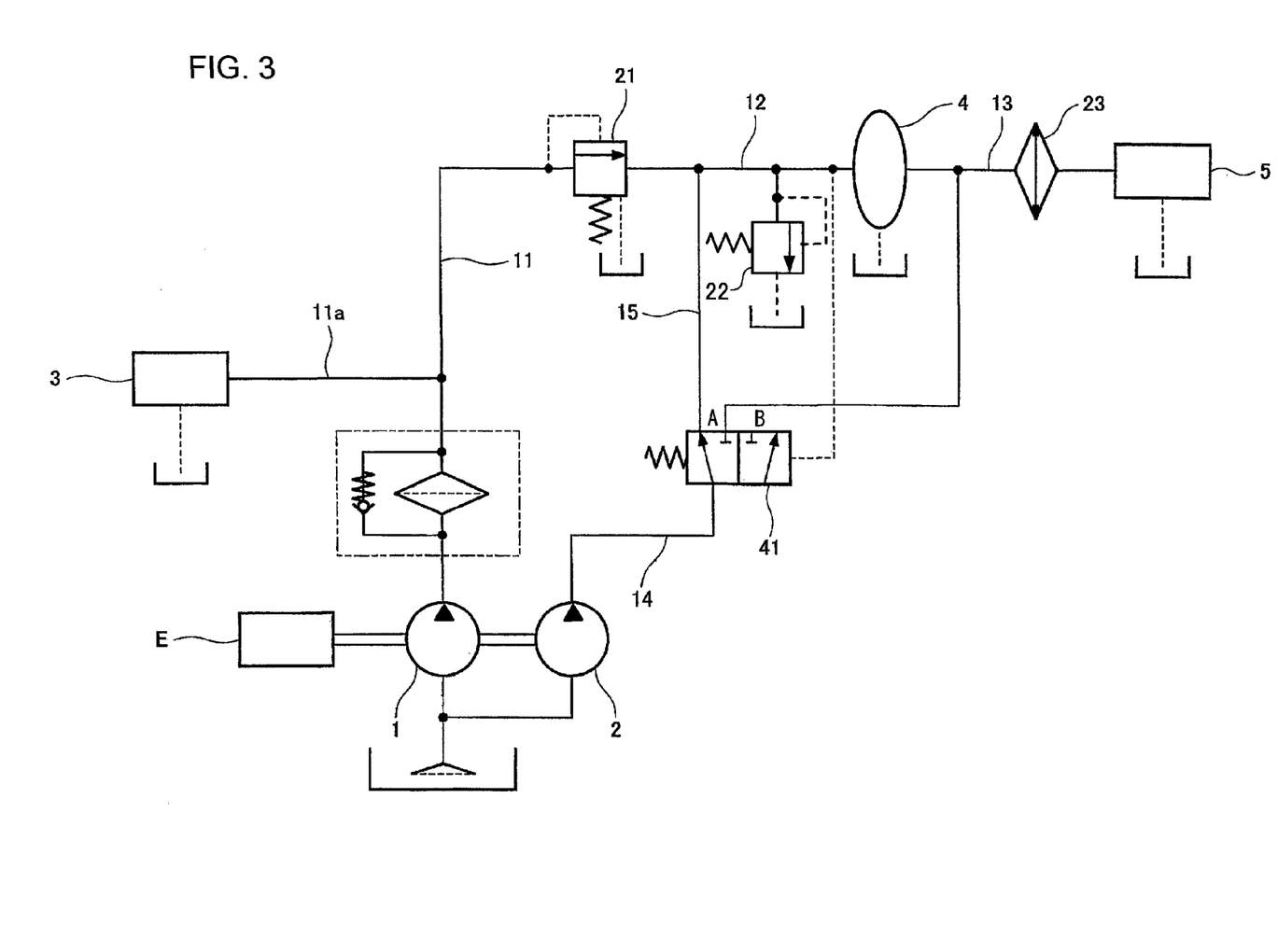
[FIG. 3] A diagram showing another variation of FIG. 1

In addition, as shown in FIG. 3, a directional control valve (for instance, of spring offset type) 41 of external pilot type may be provided at a branch point of the pipeline 15, to which, as external pilot pressure, pressurized oil in the pipeline 12 upstream of the torque converter 4 is to be led. In this case, operating pressure of the directional control valve 41 may be set to the same value as the set pressure P22 of the safety valve 22 (for example, 0.95 MPa). By this, when the pressure at the entrance of the torque converter is equal to or less than the set pressure P22, the directional control valve 41 is switched to a position A side and pressurized oil from the hydraulic pump 2 is supplied to the torque converter 4. When the pressure at the entrance of the torque converter exceeds the set pressure P22, the directional control valve 41 is switched to a position B side and pressurized oil from the hydraulic pump 2 is supplied to the oil cooler 23.

Figure 8:
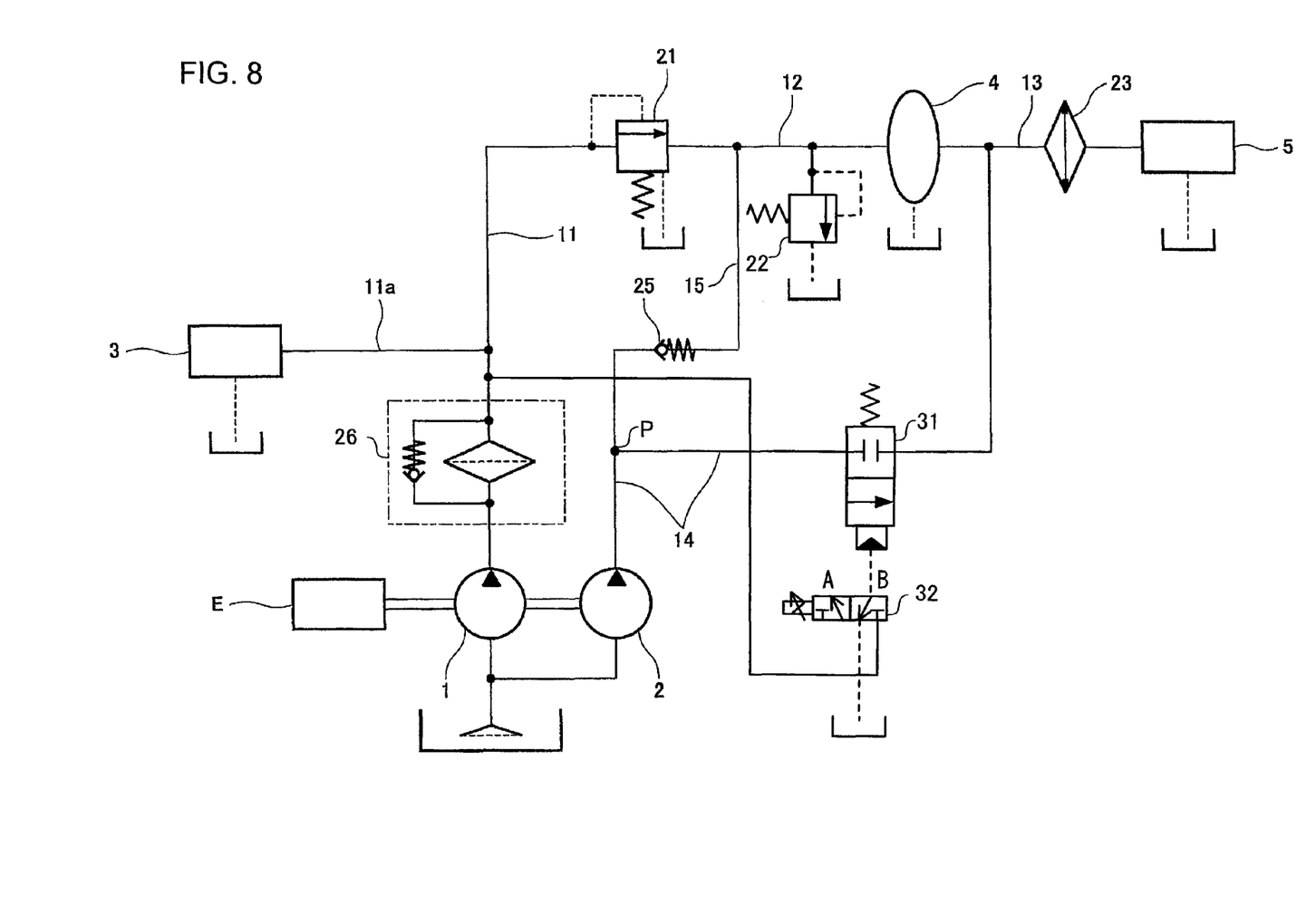
[FIG. 8] A diagram showing yet another variation of FIG. 1

As shown in FIG. 8, the on/off valve 31 of external pilot type may be provided in place of the check valve 24 so that external pilot pressure applied to the on/off valve 31 is controlled by an electromagnetic switching valve 32 and high pressurized oil upstream of the regulator 21 is led to the on/off valve 31 through the electromagnetic switching valve 32. In this case, the electromagnetic switching valve 32 is to be configured to be switched to the position A when, for instance, the pressure at the entrance of the torque converter is greater than the set pressure P22 and oil temperature is higher than a predetermined value. On the other hand, the electromagnetic switching valve 32 is to be switched to the position B when the pressure at the entrance of the torque converter is equal to or less than the set pressure P22 or oil temperature is equal to or lower than the predetermined value. By this, when the pressure at the entrance of the torque converter exceeds the set pressure P22 and oil temperature is higher than the predetermined value, the on/off valve 31 is opened and pressurized oil from the secondary hydraulic pump 2 is supplied to the oil cooler 23 though the on/off valve 31. When the pressure at the entrance of the torque converter is equal to or less than the set pressure P22 or oil temperature is equal to or lower than the predetermined value, the on/off valve 31 is closed and pressurized oil from the secondary hydraulic pump 2 is supplied to the torque converter 4. Pressurized oil is relieved through the safety valve 22 when the oil temperature is low so as to accelerate warm up.

It is to be noted that the structure of the main hydraulic circuit L1 as the first hydraulic circuit is not limited that described above as long as a circuit is formed so that pressurized oil from the main hydraulic pump 1 (the first hydraulic pump) is regulated by the regulator 21 as a pressure regulation valve and led to the transmission T as clutch control pressure, and pressurized oil that has passed through the regulator 21 is led to the torque converter 4 as torque converter operation oil. The structure of the secondary hydraulic circuit L2 as the second hydraulic circuit is not limited that described above as long as a circuit is formed so that pressurized oil from the secondary hydraulic pump 2 (the second hydraulic pump) is distributed to a circuit portion that is downstream of the regulator 21 and upstream of the safety valve 22, and to a circuit portion that is downstream of the torque converter 4 and upstream of the oil cooler 23. The structure of the safety valve 22, through which pressurized oil on the entrance side of the torque converter is released to the reservoir when the pressure at the entrance of the torque converter 4 becomes equal to or greater than the predetermined value P22, is not limited to that described above. Although in the above embodiment the flow in the secondary hydraulic circuit L2 is assumed to be controlled based on the pressure at the torque converter entrance, it may be controlled based on the speed ratio between the input shaft and the output shaft of the torque converter 4.

Although the above description has presented an example in which the travel control device of the present invention is adopted in a wheel loader, the present invention may be adopted in other work vehicles in the same manner. Namely, as long as the features and functions of the present invention are realized effectively, the present invention is not limited to the hydraulic pressure supply device achieved in the embodiment.

The disclosure of the following priority application is herein incorporated by reference:

Japanese Patent Application No. 2007-248308 filed Sep. 26, 2007

The invention claimed is:

1. A hydraulic pressure supply device for industrial vehicle, comprising:
   a first hydraulic pump and a second hydraulic pump that are driven by an engine;
   a first hydraulic circuit that leads, as clutch control pressure, pressurized oil which is supplied from the first hydraulic pump to a transmission after regulating the pressurized oil by a pressure regulation valve, and that leads, as torque converter operation oil, pressured oil which has passed through the pressure regulation valve to a torque converter, and then leads pressurized oil which has passed through the torque converter to an oil cooler;
   a safety valve that is connected to the first hydraulic circuit between the pressure regulation valve and the torque converter and, that releases pressurized oil on a torque converter entrance side to a reservoir when pressure on an entrance side of the torque converter is equal to or greater than a predetermined value;
   a second hydraulic circuit, through which pressurized oil from the second hydraulic pump is distributed to a circuit portion downstream of the pressure regulation valve and upstream of the safety valve and to a circuit portion downstream of the torque converter and upstream of the oil cooler; and
   a flow control device that changes a proportion of a rate of flow in the second hydraulic circuit so that a proportion of the rate of flow to the circuit portion downstream of the torque converter and upstream of the oil cooler increases as pressure at an entrance of the torque converter increases.

2. A hydraulic pressure supply device for industrial vehicle according to claim 1, wherein:

the flow control device comprises a check valve disposed in the second hydraulic circuit, through which pressurized oil from the second hydraulic pump is led to the circuit portion downstream of the torque converter and upstream of the oil cooler, and a cracking pressure at the check valve is set so that operating pressure at the check valve is substantially equal to a set pressure at the safety valve.

3. A hydraulic pressure supply device for industrial vehicle according to claim 1, wherein:

the flow control device comprises an on/off valve of external pilot type that is disposed in the second hydraulic circuit, through which pressurized oil from the second hydraulic pump is led to the circuit portion downstream of the torque converter and upstream of the oil cooler, and that is switched by a pressure at an entrance of the torque converter.

4. A hydraulic pressure supply device for industrial vehicle according to claim 1, wherein:

the flow control device comprises a directional control valve of external pilot type that is disposed at a branch point at which pressurized oil from the second hydraulic pump is distributed to the circuit portion downstream of the pressure regulation valve and upstream of the safety valve and to the circuit portion downstream of the torque converter and upstream of the oil cooler, and that is switched by a pressure at an entrance of the torque converter.

* * * * *